US010583797B2

(12) United States Patent
Line et al.

(10) Patent No.: US 10,583,797 B2
(45) Date of Patent: Mar. 10, 2020

(54) CARRIER FOR AIRBAG

(71) Applicant: Ford Global Technologies, LLC, Dearborn, MI (US)

(72) Inventors: Johnathan Andrew Line, Northville, MI (US); Alan George Dry, Grosse Pointe Woods, MI (US); Daniel Ferretti, Commerce Township, MI (US); Brian Robert Spahn, Plymouth, MI (US); Benjamin Yilma, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 113 days.

(21) Appl. No.: 15/786,821

(22) Filed: Oct. 18, 2017

(65) Prior Publication Data
US 2019/0111877 A1  Apr. 18, 2019

(51) Int. Cl.
*B60R 21/18* (2006.01)
*B60R 21/207* (2006.01)
*B60N 2/42* (2006.01)
*B60N 3/00* (2006.01)
*B60R 21/233* (2006.01)
*B60R 21/232* (2011.01)
*B60R 21/231* (2011.01)

(52) U.S. Cl.
CPC ............... *B60R 21/18* (2013.01); *B60N 2/42* (2013.01); *B60N 3/001* (2013.01); *B60R 21/207* (2013.01); *B60R 21/233* (2013.01); *B60R 21/232* (2013.01); *B60R 2021/23107* (2013.01); *B60R 2021/23169* (2013.01); *B60R 2021/23308* (2013.01)

(58) Field of Classification Search
CPC ..... B60R 21/18; B60R 21/233; B60R 21/207; B60R 2021/23169; B60R 2021/23107; B60R 21/232; B60R 2021/21537; B60N 2/4263; B60N 3/001
See application file for complete search history.

(56) References Cited

U.S. PATENT DOCUMENTS

| 3,623,768 | A | * | 11/1971 | Capener | ................ | B60R 21/207 |
| | | | | | | 297/330 |
| 3,985,374 | A | * | 10/1976 | Powaska | ................ | B60N 3/004 |
| | | | | | | 280/730.1 |
| 5,375,908 | A | * | 12/1994 | Goor | ....................... | B60R 21/01 |
| | | | | | | 297/216.11 |
| 5,492,361 | A | * | 2/1996 | Kim | ........................ | B60R 21/02 |
| | | | | | | 280/730.1 |

(Continued)

FOREIGN PATENT DOCUMENTS

DE            4131998 A1    3/1993
DE       102007052975 A1    5/2009
(Continued)

*Primary Examiner* — Frank B Vanaman
(74) *Attorney, Agent, or Firm* — Frank A. McKenzie; Bejin Bieneman PLC

(57) ABSTRACT

A vehicle seat assembly includes a seat, an arm connected to the seat, a carrier supported by the arm, and an airbag supported by the carrier. The arm is moveable between a stowed position and a deployed position. The carrier is spaceable from the seat when the arm is in the deployed position. The airbag is inflatable to an inflated position in a direction toward the seat.

20 Claims, 9 Drawing Sheets

(56) References Cited

U.S. PATENT DOCUMENTS

| | | | |
|---|---|---|---|
| 5,575,533 A * | 11/1996 | Glance | B60N 2/682 |
| | | | 297/232 |
| 5,577,765 A | 11/1996 | Takeda et al. | |
| 5,730,458 A * | 3/1998 | Byon | B60R 19/00 |
| | | | 280/730.2 |
| 5,743,554 A * | 4/1998 | Friedrich | B60R 21/02 |
| | | | 280/730.1 |
| 5,871,230 A | 2/1999 | Lewis | |
| 6,030,036 A * | 2/2000 | Fohl | B60R 21/207 |
| | | | 297/216.14 |
| 6,431,586 B1 | 8/2002 | Eyrainer et al. | |
| 6,736,455 B1 | 5/2004 | Zakovic et al. | |
| 7,070,201 B2 | 7/2006 | Song et al. | |
| 7,992,502 B1 | 8/2011 | Davis | |
| 8,789,847 B2 | 7/2014 | Nagasawa et al. | |
| 8,985,622 B1 * | 3/2015 | Cannon | B60R 21/231 |
| | | | 280/730.2 |
| 9,533,651 B1 * | 1/2017 | Ohno | B60R 21/23138 |
| 2002/0190548 A1 * | 12/2002 | Ruel | B60R 21/207 |
| | | | 297/216.1 |
| 2008/0054602 A1 | 3/2008 | Yang | |
| 2010/0066064 A1 * | 3/2010 | Kotikovsky | B60R 7/06 |
| | | | 280/728.3 |
| 2018/0281724 A1 * | 10/2018 | Nagasawa | B60R 21/055 |

FOREIGN PATENT DOCUMENTS

| | | | | |
|---|---|---|---|---|
| DE | 102011016583 A1 | 10/2012 | | |
| EP | 1632407 A2 | 3/2006 | | |
| GB | 1314608 A | 4/1973 | | |
| JP | 2008-222199 | * | 9/2008 | B60R 21/16 |

* cited by examiner

CARRIER FOR AIRBAG

BACKGROUND

Vehicles may include a variety of passive restraint systems, including airbags that can deploy during a vehicle impact. Airbags can assist in absorbing energy from vehicle occupants during the impact. The airbag may be a component of an airbag assembly, including a housing supporting an airbag, and an inflator in communication with the airbag for inflating the airbag from an uninflated position to an inflated position.

The vehicle may include an impact sensing system in communication with the airbag assembly for sensing a vehicle impact and instructing the inflator to inflate airbags when a vehicle impact is sensed. The impact sensing system may sense a direction of the impact and may selectively inflate, or not inflate, certain airbags of the vehicle, or extensions of the airbags, based on the type and magnitude of impact that is sensed, e.g., based on the direction, magnitude, etc.

DETAILED DESCRIPTION

Figure 1:
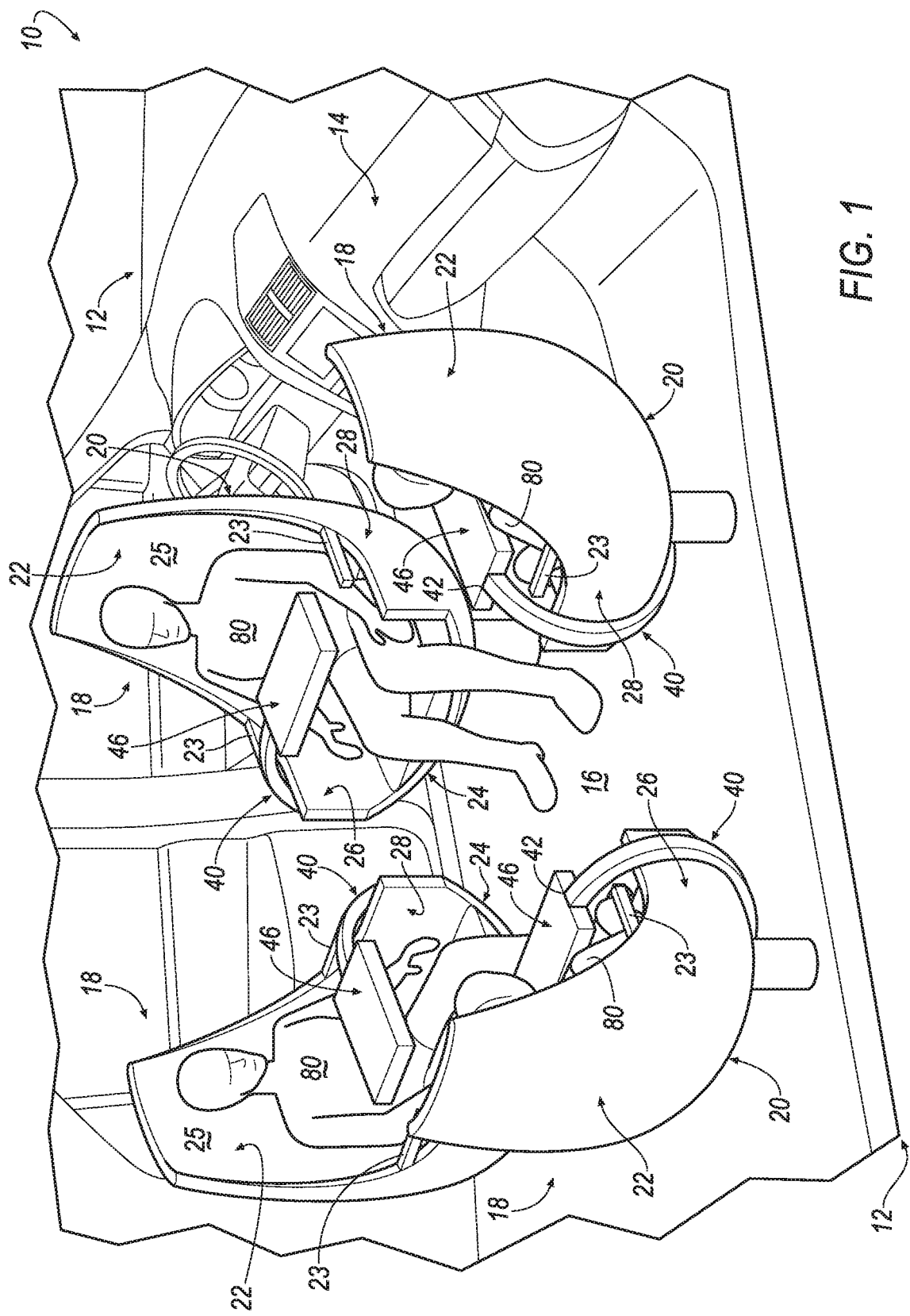
FIG. 1 is a perspective view of a passenger cabin of an example vehicle with a cutaway to show vehicle seats.

A vehicle seat assembly includes a seat, an arm connected to the seat, a carrier supported by the arm, and an airbag supported by the carrier. The arm is moveable between a stowed position and a deployed position. The carrier is spaceable from the seat when the arm is in the deployed position. The airbag is inflatable to an inflated position in a direction toward the seat.

The vehicle seat assembly can include a seat bottom having a forward end, a rearward end, and a raised section between the forward and rearward ends. The raised section can be proximal the forward end relative to the rearward end.

The vehicle seat assembly can further include an elongated track supported by the seat, the track slideably connecting the arm to the seat. The track can be elongated along a lower surface of the seat bottom in a direction from a first side of the seat to a second side of the seat. A portion of the track can be positioned below the raised section of the seat bottom.

The vehicle seat assembly can further include a slide rail that can support the arm. The slide rail can slideably engage the track.

The carrier of the vehicle seat assembly can be fixedly secured adjacent an end of the arm. The carrier can include a frame supporting a first lid and a second lid, with the carrier frame between the first and second lids. The airbag can be disposed between the first and second lids The first and second lids can have proximate ends and distal ends. The proximate ends of the first and second lids can be proximal the seat relative to the distal ends when the carrier is spaced from the seat and the first and second lids are in a closed position.

The proximate ends of the first and second lids can be moveable in a direction away from the carrier frame to open positions. The proximate ends can be moveable to predetermined locations away from the carrier frame when the first and second lids are in the open position.

Each of the first and second lids can have a top side and a bottom side. The bottom sides can abut the airbag when the first and second lids are in the open position, and the airbag is in the inflated position.

When the airbag is in the inflated position, a first portion of the airbag can abut and extend in a direction away from the bottom side of the first lid. A second portion of the airbag can abut and extend in a direction away from the bottom side of the second lid.

The carrier of the vehicle seat assembly can further include a first surface. The first surface can be supported by the carrier frame adjacent the first lid and proximal the seat relative to the first lid when the carrier is spaced from the seat. The airbag can abut and extend in a direction away from the first surface when the airbag is in the inflated position.

The carrier of the vehicle seat assembly can further include a second surface. The second surface can be supported by the carrier frame adjacent the second lid and proximal the seat relative to the second lid when the carrier is spaced from the seat. The airbag can abut and extend in a direction away from the second surface when the airbag is in the inflated position.

With reference to the Figures, wherein like numerals indicate like parts throughout the several views, a vehicle 10 can include a passenger compartment 14 having one or more vehicle seat assemblies 18.

The vehicle seat assembly 18 includes a seat 20, an arm 40 connected to the seat 20, a carrier 46 supported by the arm 40, and an airbag 74 supported by the carrier 46. The arm 40 is moveable between a stowed position and a deployed position. The carrier 46 is spaceable from the seat 20 when the arm is in the deployed position. The airbag 74 is inflatable to an inflated position in a direction toward the seat 20.

Although illustrated as a sedan, the vehicle 10 may include any passenger or commercial vehicle such as a car, a truck, a sport utility vehicle, a crossover vehicle, a van, a minivan, a taxi, a bus, etc. Moreover, the vehicle 10 may be powered in a variety of known ways, such as with an electric motor, an internal combustion engine, and/or combinations thereof.

The vehicle 10 may be an autonomous vehicle. Autonomous vehicles use a variety of sensors and computing devices to operate the vehicle 10 with various levels of input from a human driver. The computing device(s) of the vehicle 10 may operate the vehicle 10 in an autonomous mode, a semi-autonomous mode, or a non-autonomous mode. An autonomous mode is defined as one in which each of a propulsion, braking, and steering system of the vehicle 10 are controlled by the computer; in a semi-autonomous mode the computing device controls one or two propulsion, braking, and steering systems of the vehicle 10; in a non-autonomous mode, a human operator controls the propulsion, braking, and steering systems of the vehicle 10.

The Society of Automotive Engineers (SAE) has defined multiple levels of autonomous vehicle operation. At levels 0-2, the human driver monitors or controls almost all driving tasks, generally with no help from the vehicle 10. For example, at level 0 ("no automation"), a human driver is responsible for all vehicle operations. At level 1 ("driver assistance"), the vehicle 10 sometimes assists with steering, acceleration, or braking, but the human driver is still responsible for much of the vehicle control. At level 2 ("partial automation"), the vehicle 10 can control steering, acceleration, and braking under certain circumstances without human interaction. At levels 3-5, the vehicle 10 assumes more driving related tasks. At level 3 ("conditional automation"), the vehicle 10 can handle steering, acceleration, and braking under certain circumstances, as well as driving environment monitoring. Level 3 still requires the human driver to intervene occasionally. At level 4 ("high automation"), the vehicle 10 can handle the same tasks as at level 3, but without relying on the human driver to intervene in certain driving modes. At level 5 ("full automation"), the vehicle 10 can handle almost all tasks without any human driver intervention.

The vehicle 10 can have a body 12. The body 12 may be formed of any suitable material. For example, the body can be formed of steel, aluminum, etc. Alternatively, the body 12 can be of any other suitable material or combinations of material of any suitable thickness.

The body 12 can be supported by a frame (not shown). The body 12 and the frame can be a unibody construction. In the unibody construction, the body 12, e.g., rocker panels, etc., serves as the frame, and the body 12 (including the rocker panels, pillars, roof rails, etc.) is unitary, i.e., a continuous one-piece unit.

In another approach, the body 12 can have a body-on-frame construction (also referred to as a cab-on-frame construction). In other words, the body 12 and the frame are separate components, i.e., modular, and the body 12 is supported on and fixed to the frame.

The body 12 includes exterior surfaces, such as a hood, windows, lids and/or hatches. Exterior surfaces of the body 12 can present a Class-A, substantially defect-free, finely-finished surface appearance. The exterior surfaces can be formed from any suitable material, such as painted steel, aluminum and plastic, etc.

With reference to FIG. 1, the body 12 of the vehicle 10 can include a passenger compartment 14. The passenger compartment 14 can include multiple vehicle seat assemblies 18. The vehicle seat assemblies 18 can, for example, be mounted in a fixed position on a floor 16 of the passenger compartment 14.

In another example, the vehicle seat assemblies 18 may be moveable relative to the floor 16 of the passenger compartment 14. The vehicle seat assemblies 18 can be moveable independently. Additionally, and alternatively, the vehicle seat assemblies 18 may be moveable together as a unit. In one example, each of the vehicle seat assemblies 18 may be independently moveable relative to the floor 16 of the vehicle 10 in a vehicle fore-and-aft direction, and/or in a cross-vehicle direction.

Additionally, the vehicle seat assemblies 18 may be rotatable relative the floor 16, as shown in FIG. 1. When rotated, the vehicle seat assemblies 18 can be fixed at any location throughout a rotation relative to an initial location, e.g., at 45 degrees relative to the initial location, etc.

As shown in FIGS. 1-5B and discussed above, each of the vehicle seat assemblies 18 includes the seat 20. The seat 20 may include a seat back 22 and a seat bottom 24. The seat 20 can also include a headrest (not shown). The headrest may be supported by the seat back and may be stationary or movable relative to the seat back 22.

The seat back 22 can be supported by the seat bottom 24 and extend upwardly from the seat bottom 24. The seat back 22 may be stationary or movable relative to the seat bottom 24. For example, the seat back 22 may recline relative to the seat bottom 24. In addition, the seat back 22 may be foldable over the seat bottom 24 from an upright position to a flat position such that the seat back 22 abuts the seat bottom 24 along a length of the seat back 22. The seat back 22 can support armrests 23 as shown in the Figures.

The seat bottom 24 can include a forward end 30, a rearward end 34, and a raised section 32 between the forward and rearward ends 30, 34. The raised section 32 is raised relative to the forward and rearward ends 30, 34 (i.e., in a generally vertical direction when oriented in the vehicle 10). The raised section 32 may be ramped relative to the forward and rearward ends 30, 34. The rearward end 34 may be adjacent the seat back 22 when the seat back 22 extends upwardly from the seat bottom 24. The raised section 32 can be disposed proximal the forward end 30 relative the rearward end 34. The raised section 32 may be referred to as an "anti-submarine ramp."

Figure 3A:
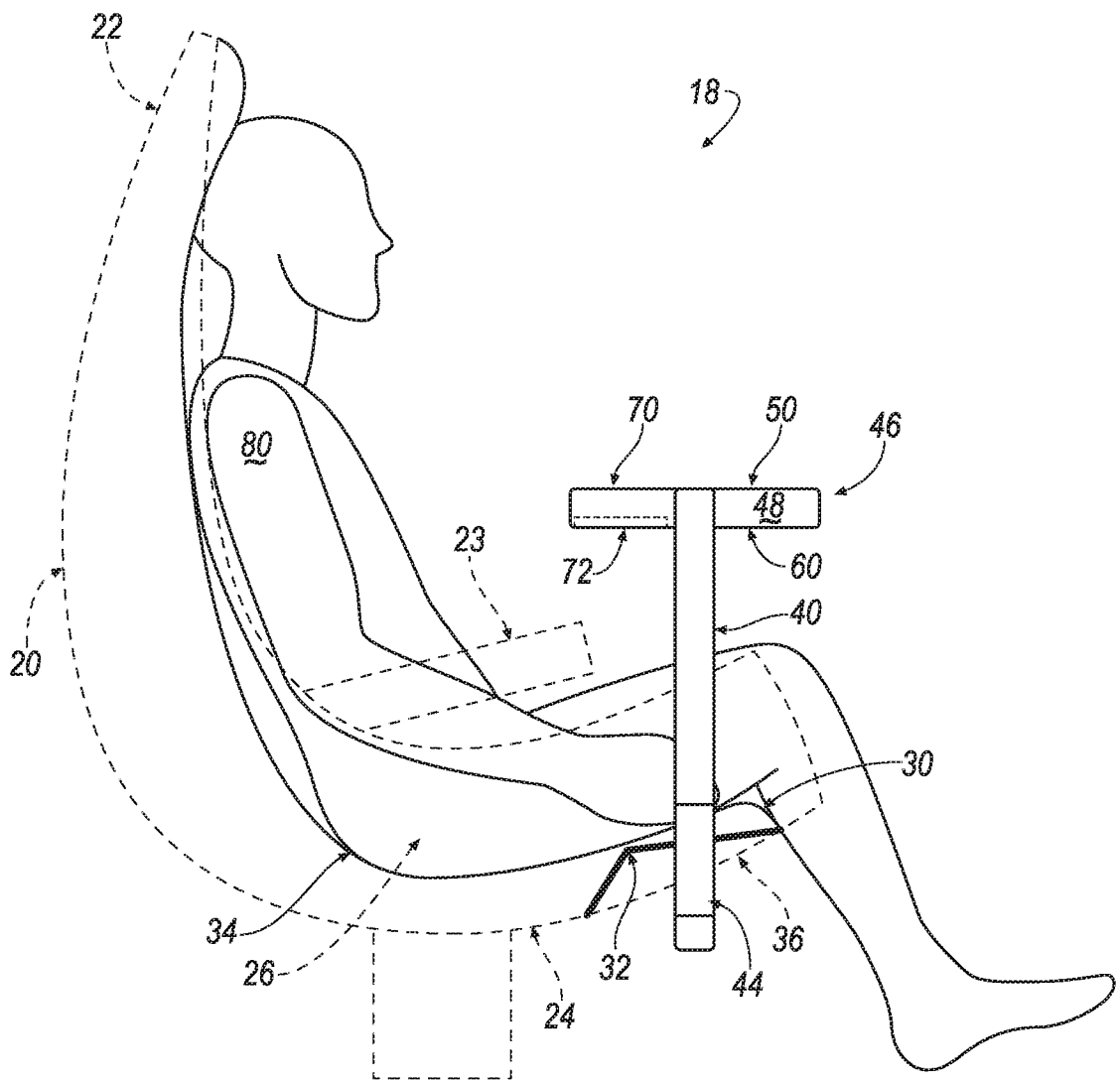
FIG. 3A is a side view of the vehicle seat assembly with a seat in hidden line, the arm in the deployed position, and a carrier spaced from the seat.
Figure 4A:
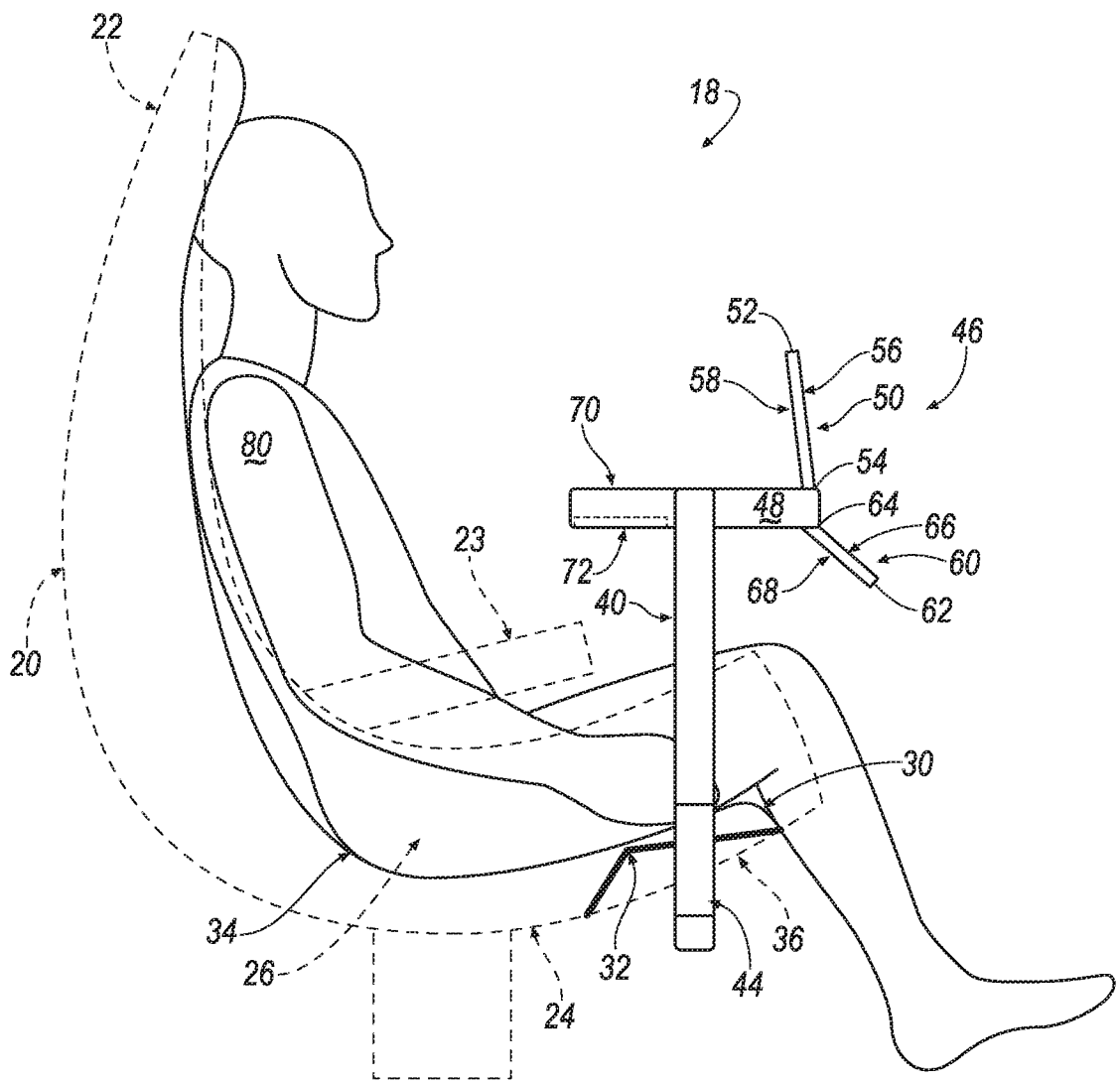
FIG. 4A is a side view of the vehicle seat assembly with the seat in hidden line, the arm in the deployed position, the carrier spaced from the seat, and first and second lids in open positions.
Figure 5A:
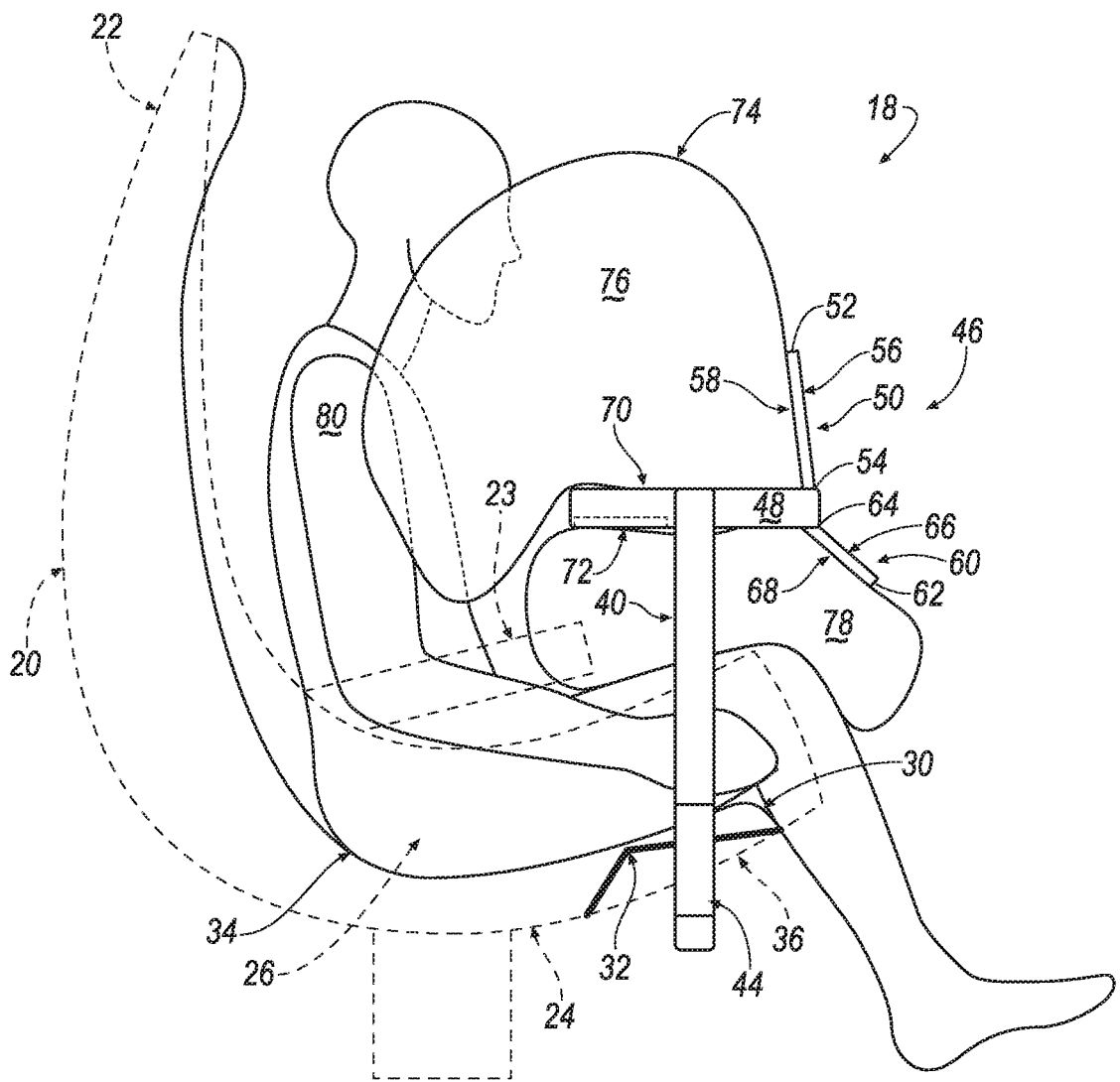
FIG. 5A is a side view of the vehicle seat assembly with the seat in hidden line, the arm in the deployed position, the carrier spaced from the seat, the first and second lids in open positions, and an airbag in an inflated position.

As shown in FIGS. 3A, 4A and 5A, when an occupant 80 is seated in the seat 20, a pelvis of the occupant 80 can be positioned between the rearward end 34 and the raised section 32 of the seat bottom 24. In this way, the raised section 32 can assist in preventing the pelvis of the occupant 80 from sliding forward, and, therefore, the occupant 80 from sliding off the seat bottom 24.

For example, referring to FIGS. 5A-B and as further discussed below, the airbag 74 can inflate to the inflated position in the direction toward the seat 20 during, e.g., an impact event. The airbag 74 can assist in absorbing energy from the occupant 80 due the impact. In this way, the airbag 74 and the raised section 32 of the seat bottom 24 can assist in retaining the occupant 80 in the seat 20 during the impact event.

The raised section 32 of the seat bottom 24 can be elongated. The raised section 32 can, e.g., be elongated in a direction generally parallel to the forward and rearward ends 30, 34 of the seat bottom 24.

As shown in FIGS. 1, 2A-B, 3B, 4B and 5B, the seat 20 can include a first side 26 and a second side 28. The seat bottom 24 can extend between the first and second sides 26, 28. The raised section 32 of the seat bottom 24 can be elongated from the first side 26 of the seat 20 to the second side 28 of the seat 20. Alternatively, the raised section 32 can be elongated for a distance between the first and second sides 26, 28.

The seat 20, including the seat bottom 24 and/or the seat back 22, can include a seat frame (not shown). The seat frame may include tubes, beams, etc. The seat frame may be formed of any suitable plastic material, e.g., carbon fiber reinforced plastic (CFRP), glass fiber-reinforced semi-finished thermoplastic composite (organosheet), etc. Additionally, some or all components of the seat frame may be formed of a suitable metal, e.g., steel, aluminum, etc. The seat frame can be configured to form the raised section 32 of the seat bottom 24.

The seat 20 can also include a covering 25. The covering 25 can be supported over the seat frame. The covering 25 can include upholstery and padding. The upholstery may be formed of cloth, leather, faux leather, and/or other suitable materials. The upholstery may be stitched in panels around the seat frame. The padding may be between the covering 25 and the seat frame, and may be foam and/or other suitable materials. The foam and/or other suitable materials can be configured to form the raised section 32 of the seat bottom 24. Alternatively, the foam and/or other suitable materials may be combined with the seat frame as well as other structures to form the raised section 32.

As shown in the Figures, the seats 20 of the vehicle seat assemblies 18 are depicted as single-occupancy seats 20. The vehicle seat assemblies 18 could also be configured for multiple occupants. For example, the seats 20 can be bench seat (not shown), etc.

Figure 2A:
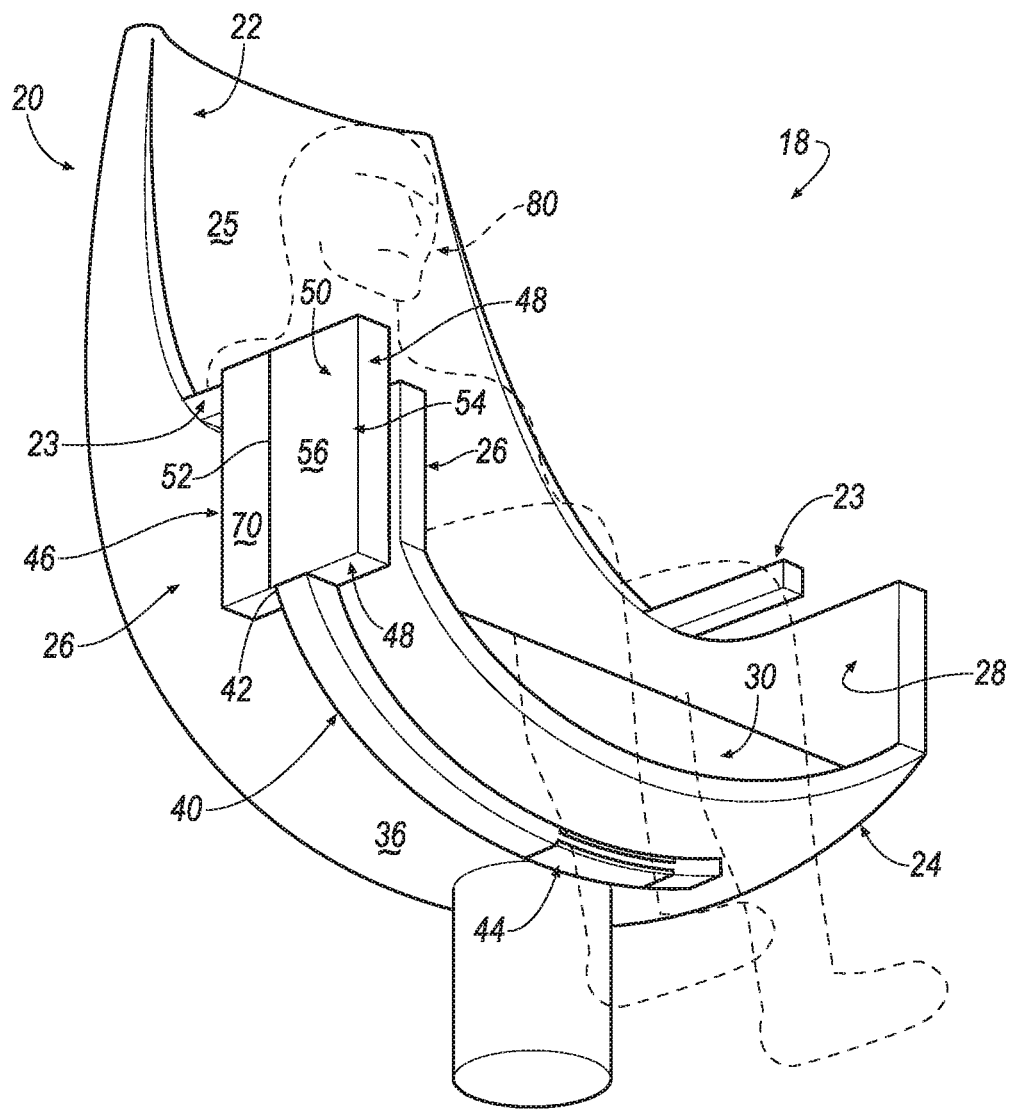
FIG. 2A is a perspective view of an example of a vehicle seat assembly with an arm in a stowed position.
Figure 2B:
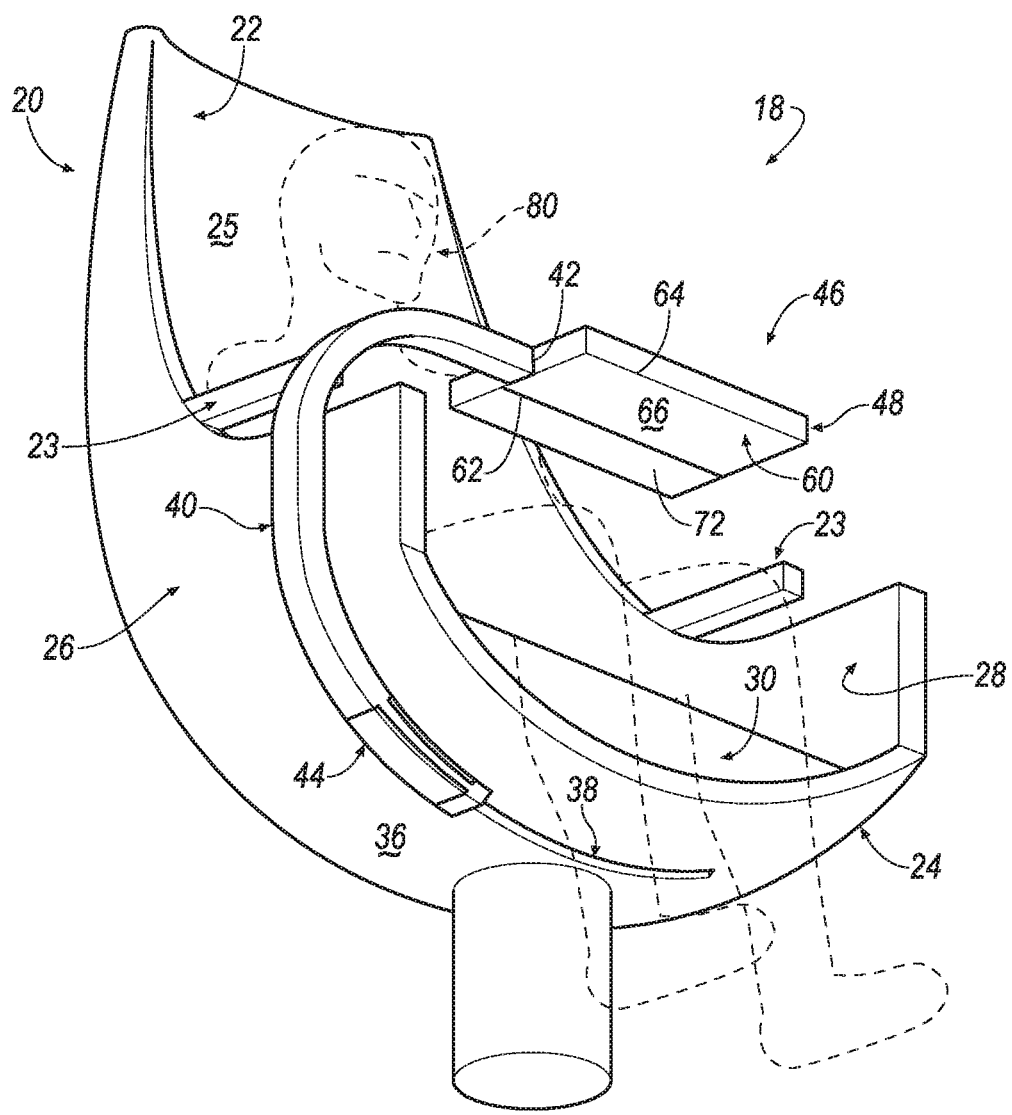
FIG. 2B is a perspective view of the example of the vehicle seat assembly of FIG. 2A with the arm in a deployed position.

As shown in FIGS. 2A-B, the arm 40 of the vehicle seat assembly 18 is moveably connected to the seat 20. The arm 40 is moveable between the stowed position and the deployed position. The arm 40 can be moveable between the stowed and deployed positions in any of a variety of ways.

In one approach, the arm 40 may be pivotally connected to the first or the second sides 26, 28 of the seat 20, with the arm 40 rotatable between the stowed and deployed positions.

For example, the arm 40 can be moveably connected to the seat 20 via a pivot point, e.g., a ball-and-socket, a hinge joint, etc., positioned on the first or second side 26, 28 of the seat 20. In this approach, the arm 40 can be rotated from the stowed position, to a position forward of the forward end 30 of the seat bottom 24, to the deployed position. The arm 40 can likewise be rotated from the deployed position, to a position forward of the forward end 30 of the seat bottom 24, to the stowed position. In this example, the carrier 46 may be positioned below a lower surface 36 of the seat bottom 24 when the arm 40 is in the stowed position (not shown).

In another approach, the arm 40 can be moveable between the stowed position (FIG. 2A) and the deployed position (FIG. 2B) via an elongated track 38. The elongated track 38 can be positioned, e.g., on a back surface of the seat back 22, on the lower surface 36 of the seat bottom 24, etc.

Referring to the example shown in FIGS. 2A-B, the lower surface 36 of the seat bottom 24 includes the elongated track 38. The elongated track 38 can be elongated along the lower surface 36 of the seat bottom 24 in a direction from the first side 26 to the second side 28 of the seat 20. A portion of the elongated track 38 can be positioned below the raised section 32 of the seat bottom 24, e.g., directly below the raised section 32 of the seat bottom 24.

The arm 40 and the elongated track 38 can include corresponding interfaces such that the arm 40 is movable along the elongated track 38 between the stowed and the deployed positions. For example, the elongated track 38 can have a C-shaped cross section (not shown) to form a first interface.

As shown in FIGS. 2A-5B, a slide rail 44 may support the arm 40, and can include a second interface (not shown) corresponding to the first interface. For example, the second interface may include roller bearings, a slideable inner track, etc. As such, the slide rail 44 can slideably engage the track 38, thereby allowing the arm 40 to move along the track 38 between the stowed position and the deployed position.

The arm 40 can be manually and/or automatically moveable between the stowed and deployed positions. For example, the elongated track 38 may include a plurality of teeth (not shown) spaced from each other along a length of the elongated track 38. The arm 40, the slide rail 44, or both, can include rotatable gear(s) (not shown) operably connected to a motor (not shown). The rotatable gear(s) can engage one or more of the plurality of teeth of the elongated track 38. When the motor is activated, the rotatable gear(s) can rotate, and the arm can automatically move along the track 38 between the stowed position and the deployed position.

A sensor (not shown) may also be associated with the vehicle seat assembly 18. The sensor can detect, e.g., when the seat 20 is occupied by the occupant 80. In one approach, when the sensor detects the occupant 80 is seated in the seat 20, the arm 40 may automatically move from the stowed position to the deployed position.

The arm 40 can be moveably connected to the seat 20, directly or indirectly. In the examples shown in the Figures, the arm 40 is moveably connected to the seat 20 via the slide rail 44. As discussed above, for example, the slide rail 44 can support the arm 40, and slideably engage the track 38.

The slide rail 44 may be formed as a sleeve surrounding the arm 40, as shown in FIGS. 2A-5B. The slide rail 44 can be secured to the arm 40 in any suitable way, e.g., fasteners, adhesives, welding, etc. The slide rail 44 may be formed of metal, e.g., steel, aluminum, etc., as well as other suitable materials, such as plastic and/or composite materials. The slide rail 44 may also be formed from a combination of materials. While the slide rail 44 and the arm 40 shown in the Figures and described herein may be separate structures, the arm 40 and slide rail 44 can also be formed as a single structure.

Figure 3B:
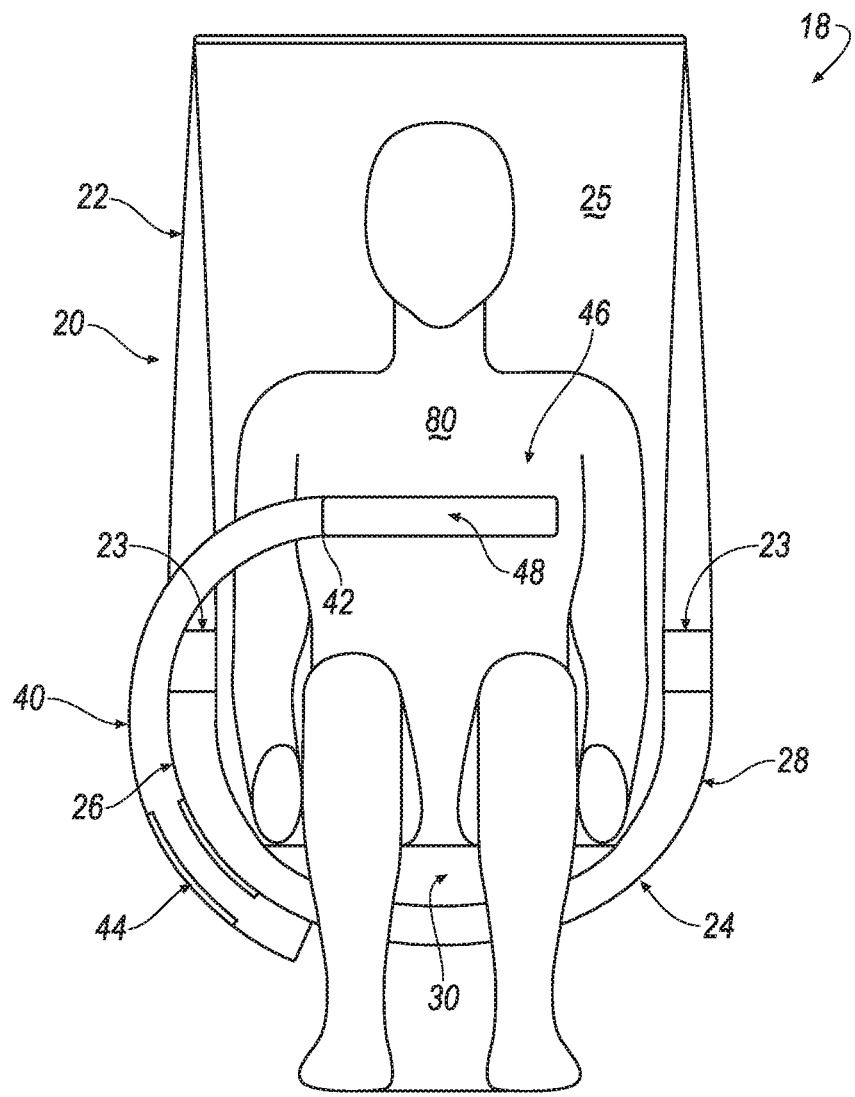
FIG. 3B is a front view of the vehicle seat assembly of FIG. 3A.
Figure 4B:
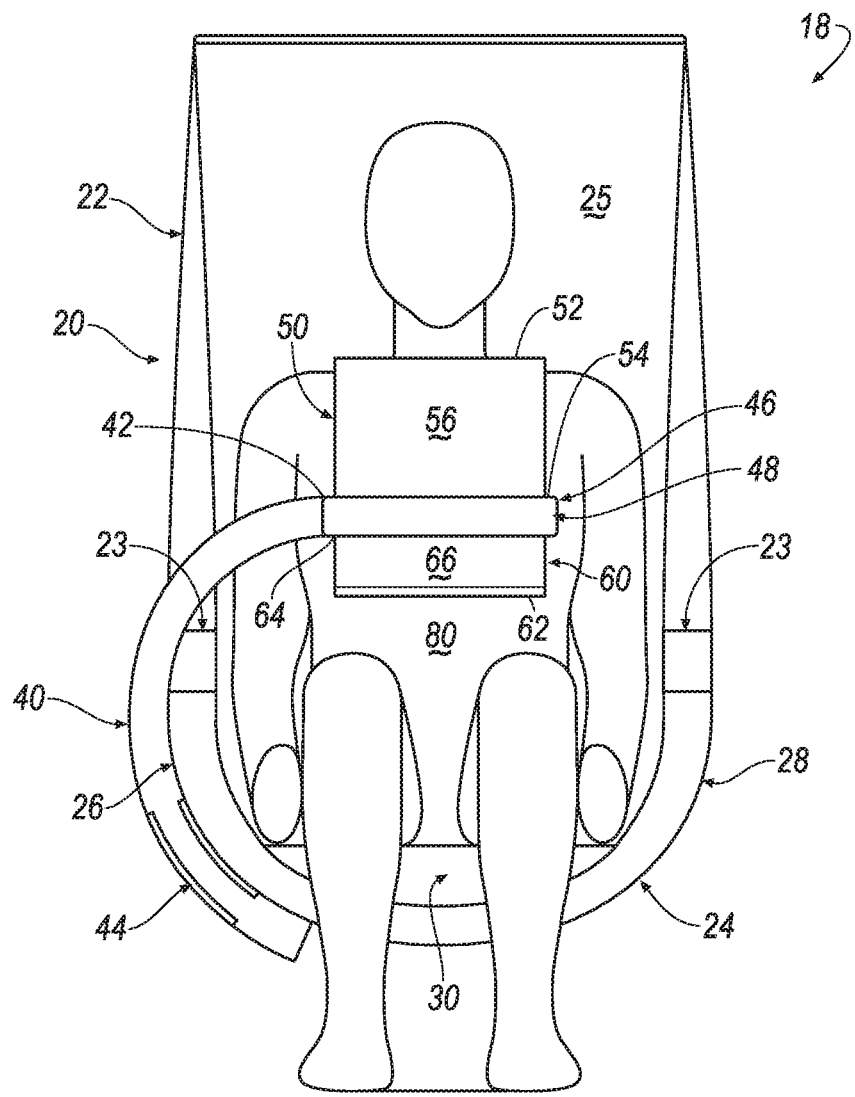
FIG. 4B is a front view of the vehicle seat assembly of FIG. 4A.
Figure 5B:
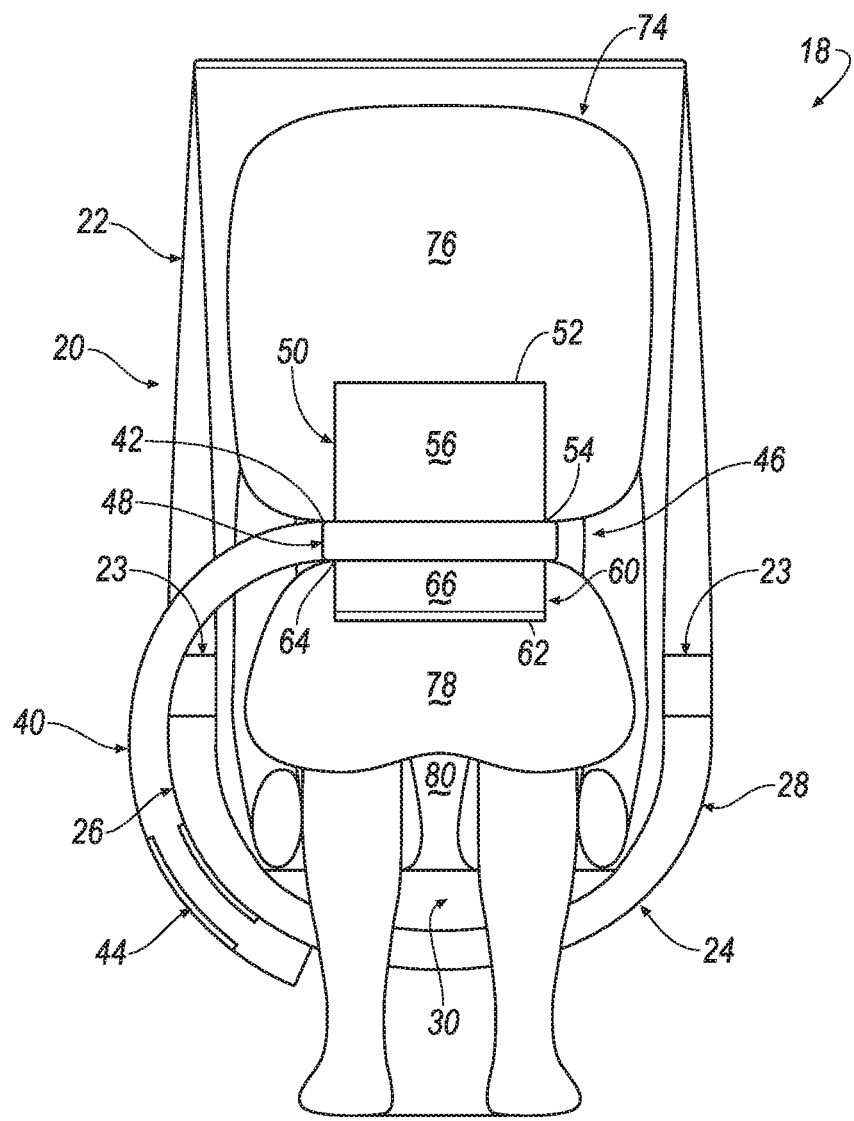
FIG. 5B is a front view of the vehicle seat assembly of FIG. 5A.

In the example of the arm 40 shown in FIGS. 3B, 4B and 5B, the arm 40 is generally C-shaped. The arm 40 may be a different shape. For example, the arm 40 can be configured in any shape to allow the arm 40 to be moveable between the stowed and deployed positions, to accommodate a location of the moveable connection between the arm 40 and the seat 20, and to space the carrier 46 from the seat 20 when the arm 40 is in the deployed position.

Referring back to FIGS. 3B, 4B and 5B, one end of the arm 40 can be proximate the slide rail 44. Another end 42 of the arm 40 can be adjacent the carrier 46. The arm 40 is moveable between the stowed and deployed positions, and configured to space the carrier 46 from the seat 20 when the arm 40 is in the deployed position. The arm 40 can be formed of rigid materials, such as metal, plastic, composite materials, and the like. The arm 40 can also be formed of a combination of suitable materials.

As discussed above, and shown in FIGS. 1-5B, the carrier 46 is supported by the arm 40, and spaceable from the seat 20 when the arm 40 is in the deployed position. For example, the carrier 46 can be fixedly secured adjacent the end 42 of the arm 40 such that when the arm 40 is in the deployed position, the carrier 46 is spaced from the seat 20.

The carrier 46 can include a first lid 50, a second lid 60, and a carrier frame 48 between the first and second lids 50, 60. The airbag 74 can be disposed between the first and second lids 50, 60, e.g., within a perimeter of the carrier frame 48.

The first and second lids 50, 60 can be moveable to open positions. In FIGS. 1-3B, the first and second lids 50, 60 are shown in a closed position. In FIGS. 4A-5B, the first and second lids 50, 60 are shown in the open position.

While FIGS. 4A-5B show each of the first and second lids 50, 60 in the open position, the first and second lids 50, 60 may be configured to independently move to the open position. For example, the first lid 50 can be moveable to the open position while the second lid 60 remains in the closed position. Similarly, the second lid 60 can be moveable to the open position while the first lid 50 remains in the closed position.

Alternatively, the first and second lids 50, 60 can be configured such that when one of the first lid 50 and the second lid 60 moves to the open position, the other of the first lid 50 and second lid 60 moves to the open position.

The first lid 50 can have a proximate end 52 and a distal end 54. The proximate end 52 of the first lid 50 can be proximal the seat 20 relative to the distal end 54 when the carrier 46 is spaced from the seat 20, and the first lid 50 is in the closed position.

As shown in FIGS. 4A and 5A, the first lid 50, e.g., the proximate end 52 of the first lid 50, can be moveable away from the carrier frame 48 when the first lid 50 moves to the open position. The proximate end 52 of the first lid 50 can be moveable to a predetermined location away from the carrier frame 48, e.g., 8 inches, when the first lid 50 is in the open position, depending on a width of the first lid 50 from the distal end 54 to the proximate end 52.

The distal end 54 of the first lid 50 can be pivotally connected to the carrier frame 48. For example, a hinge joint (not shown) can secure the distal end 54 of the first lid 50 to the carrier frame 48. In this way, when the proximate end 52 of the first lid 50 moves to the open position, the hinge joint can secure the distal end 54 of first lid 50 to the carrier frame 48.

The hinge joint connecting the first lid 50 to the carrier frame 48 may have a predetermined limited axis of rotation. For example, the first lid 50 may be stopped at a predetermined location by a stopper, a hinge design, or any suitable mechanism. At the predetermined location, the airbag 74 may exert a force on a bottom side 58 of the first lid 50, and the first lid 50 may exert an opposite force on the airbag 74 through the stopper or other suitable mechanism. The predetermined axis of rotation can be, e.g., 85 degrees. As such, the proximate end 52 of the first lid 50 can be moveable to the predetermined location from the carrier frame 48 when the first lid 50 moves to the open position. In this way, the bottom side 58 of the first lid 50 can abut the airbag 74 when the airbag is in the inflated position, and serve as a reaction surface for the airbag 74.

The second lid 60 can have a proximate end 62 and a distal end 64. The proximate end 62 of the second lid 60 can be proximal the seat 20 relative to the distal end 64 when the carrier 46 is spaced from the seat 20, and the second lid 60 is in the closed position.

With continued reference to FIGS. 4A and 5A, the second lid 60, e.g., the proximate end 62 of the second lid 60, can be moveable away from the carrier frame 48 when the second lid 60 moves to the open position. The proximate end 62 of the second lid 60 can be moveable to a predetermined location away from the carrier frame 48, e.g., 5 inches, when the second lid 60 is in the open position, depending on a width of the second lid 60 from the distal end 64 to the proximate end 62.

The distal end 64 of the second lid 60 can, e.g., be pivotally connected to the carrier frame 48. For example, a hinge joint (not shown) can secure the distal end 64 of the second lid 60 to the carrier frame 48. In this way, when the proximate end 62 of the second lid 60 moves to the open position, the hinge joint can secure the distal end 64 of second lid 60 to the carrier frame 48.

The hinge joint connecting the second lid 60 to the carrier frame 48 may have a predetermined limited axis of rotation. For example, the second lid 60 may be stopped at a predetermined location by a stopper, a hinge design, or any suitable mechanism. At the predetermined location, the airbag 74 may exert a force on a bottom side 68 of the second lid 60, and the second lid 60 may exert an opposite force on the airbag 74 through the stopper or other suitable mechanism. The predetermined axis of rotation can be, e.g., 110 degrees. As such, the proximate end 62 of the second lid 60 can be moveable to the predetermined location from the carrier frame 48 when the second lid 60 moves to the open position. In this way, the bottom side 68 of the second lid 60 can abut the airbag 74 when the airbag is in the inflated position, and serve as a reaction surface for the airbag 74.

As further shown in FIGS. 4A and 5A, the first and second lids 50, 60 can each have a top side 56, 66, respectively, opposing the bottom sides 58, 68. The top sides 56, 66 can, e.g., be used as writing surface, or to support computers, other devices, and/or consumable goods when the first and second lids 50, 60 are in the closed positions.

As discussed above, the carrier 46 can include the carrier frame 48. The arm 40 can support the carrier 46 via the carrier frame 48. For example, the carrier frame 48 can be fixedly secured adjacent the end 42 of the arm 40. The carrier frame 48 can be fixedly secured adjacent the end 42 of the arm 40 in any suitable way, e.g., fasteners, adhesives, welds, combinations thereof, etc.

The perimeter of the carrier frame 48 can be a generally rectangular shape. The carrier frame 48 can be formed of any suitable material, e.g., a metal, such as steel, aluminum; a carbon fiber reinforced plastic; a glass-reinforced semi-finished thermoplastic composite; etc. etc.

In addition to the first and second lids 50, 60, the carrier frame 48 can include a first surface 70 and a second surface 72.

The first surface 70 of the carrier 46 can be supported by the carrier frame 48 adjacent the first lid 50, and proximal the seat 20 relative the first lid 50 when the carrier 46 is spaced from the seat 20. The first surface 70 may be fixed to the carrier in any suitable way, e.g., fasteners, adhesives, welds, and combinations thereof.

When the airbag 74 is in the inflated position, the first surface 70 can abut the airbag 74 and the airbag 74 can extend in a direction away from the first surface 70. In this way, the first surface 70 can serve as a reaction surface to the airbag 74. The first surface 70 can be formed of any suitable material, e.g., metal, such as steel or aluminum; a carbon fiber reinforced plastic; a glass-reinforced semi-finished thermoplastic composite; as well as combinations of the foregoing, etc.

The second surface 72 of the carrier 46 can be supported by the carrier frame 48 adjacent the second lid 60, and proximal the seat 20 relative the second lid 60 when the carrier 46 is spaced from the seat 20. The second surface 72 may be fixed to the carrier in any suitable way, e.g., fasteners, adhesives, welds, and combinations thereof.

When the airbag 74 is in the inflated position, the second surface 72 can abut the airbag 74 and the airbag 74 can extend in a direction away from the second surface 72. In this way, the second surface 72 can serve as a reaction surface to the airbag 74. The first surface 70 can be formed of any suitable material, e.g., metal, such as steel or aluminum; a carbon fiber reinforced plastic; a glass-reinforced semi-finished thermoplastic composite; as well as combinations of the foregoing, etc.

As discussed above, the airbag 74 can be supported by the carrier 46. For example, the airbag 74 can be disposed between the first and second lids 50, 60 within the perimeter of the carrier frame 48. As shown in FIGS. 5A-B, when the airbag 74 inflated to the inflated position, a first portion 76 of the airbag 74 can extend the direction toward the seat 20 via an opening in the carrier 46 when the first lid 50 moves to the open position. In this way, energy from a torso and head of the occupant 80 can be absorbed, while assisting in retaining the occupant 80 in the seat 20.

As also shown in FIGS. 5A-B, when the airbag 74 is inflated to the inflated position, a second portion 78 of the airbag 74 can extend toward the seat 20 via another opening in the carrier 46 when the second lid 60 moves to the open position. In this way, energy from legs of the occupant 80 can be absorbed, while assisting in retaining the occupant 80 in the seat 20.

While the airbag 74 shown in the Figures is a single airbag 74, multiple airbags can also be used. For example, the carrier 46 can support two or more airbags. Each of the two or more airbags can be disposed between the first and second lids 50, 60 within the perimeter of the carrier frame 48.

One of the two or more airbags can be inflatable to the inflated position and extend toward the seat 20 through the opening in the carrier 46 when the first lid 50 moves to the open position. Another of the two or more airbags can extend toward the seat 20 through the opening in the carrier 46 when the second lid 50 moves to the open position.

The airbag 74 may be formed of a woven polymer or any other material. As one example, the airbag 74 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle seat assembly comprising:
    a seat having a seat bottom and a seat back extending upwardly from the seat bottom;
    an arm connected to the seat, the arm moveable between a stowed position and a deployed position;
    a carrier supported by the arm, the carrier spaced from the seat bottom and having a bottom surface facing the seat bottom when the arm is in the deployed position, and the carrier spaced from the seat back when the arm is in the deployed position defining an occupant seating area between the carrier and the seat back;
    an airbag supported by the carrier;
    the airbag inflatable to an inflated position in a direction toward the seat bottom; and
    the carrier includes a carrier frame supporting a first lid and a second lid, the carrier frame between the first and second lids, and the airbag disposed between the first and second lids.

2. The vehicle seat assembly of claim 1, wherein the seat bottom includes a forward end, a rearward end, and a raised section between the forward and rearward ends, the raised section proximal the forward end relative the rearward end, the airbag being inflatable to the inflated position in a direction toward the raised section.

3. The vehicle seat assembly of claim 2, further comprising an elongated track supported by the seat, the track slideably connecting the arm to the seat.

4. The vehicle seat assembly of claim 3, wherein the elongated track is elongated along a lower surface of the seat bottom in a direction from a first side of the seat to a second side of the seat.

5. The vehicle seat assembly of claim 4, wherein a portion of the elongated track is positioned below the raised section of the seat bottom.

6. The vehicle seat assembly of claim 3, further comprising a slide rail supporting the arm, the slide rail slideably engaging the elongated track.

7. The vehicle seat assembly of claim 1, wherein the carrier is fixedly secured adjacent an end of the arm.

8. The vehicle seat assembly of claim 1, wherein the first and second lids have proximate ends and distal ends, the proximate ends proximal the seat relative to the distal ends when the carrier is spaced from the seat and the first and second lids are in a closed position, the proximate ends of the first and second lids moveable in a direction away from the carrier frame to an open position.

9. The vehicle seat assembly of claim 8, wherein the proximate ends of the first and second lids are moveable to predetermined locations away from the carrier frame when the first and second lids are in the open position.

10. The vehicle seat assembly of claim 8, wherein each of the first and second lids have a top side and a bottom side, the bottom sides abutting the airbag when the first and second lids are in the open position, and the airbag is in the inflated position.

11. The vehicle seat assembly of claim 10, wherein when the airbag is in the inflated position, a first portion of the airbag abuts and extends in a direction away from the bottom side of the first lid, and a second portion of the airbag abuts and extends in a direction away from the bottom side of the second lid.

12. The vehicle seat assembly of claim 8, further comprising a first surface, wherein the first surface is supported by the carrier frame adjacent the first lid and proximal the seat relative to the first lid when the carrier is spaced from the seat.

13. The vehicle seat assembly of claim 12, wherein when the airbag is in the inflated position, the airbag abuts and extends in a direction away from the first surface.

14. The vehicle seat assembly of claim 8, further comprising a surface supported by the carrier frame adjacent the second lid and proximal the seat relative to the second lid when the carrier is spaced from the seat.

15. The vehicle seat assembly of claim 14, wherein when the airbag is in the inflated position, the airbag abuts and extends in a direction away from the surface.

16. A vehicle seat assembly comprising:
    a seat;
    an arm connected to the seat, the arm moveable between a stowed position and a deployed position;
    a carrier supported by the arm, the carrier spaced from the seat when the arm is in the deployed position; and
    an airbag supported by the carrier;
    the airbag inflatable to an inflated position in a direction toward the seat;

wherein the carrier includes a carrier frame supporting a first lid and a second lid, the carrier frame between the first and second lids, and the airbag disposed between the first and second lids;

wherein the first and second lids have proximate ends and distal ends, the proximate ends proximal the seat relative to the distal ends when the carrier is spaced from the seat and the first and second lids are in a closed position, the proximate ends of the first and second lids moveable in a direction away from the carrier frame to an open position; and wherein each of the first and second lids have a top side and a bottom side, the bottom sides abutting the airbag when the first and second lids are in the open position, and the airbag is in the inflated position.

17. A vehicle seat assembly comprising:

a seat having a seat bottom and a seat back extending upwardly from the seat bottom;

an arm connected to the seat, the arm moveable between a stowed position and a deployed position;

a carrier supported by the arm, the carrier spaced from the seat bottom and having a bottom surface facing the seat bottom when the arm is in the deployed position, and the carrier spaced from the seat back when the arm is in the deployed position defining an occupant seating area between the carrier and the seat back;

an airbag supported by the carrier;

the airbag inflatable to an inflated position in a direction toward the seat bottom;

the seat bottom includes a forward end, a rearward end, and a raised section between the forward and rearward ends, the raised section proximal the forward end relative the rearward end, the airbag being inflatable to the inflated position in a direction toward the raised section; and an elongated track supported by the seat, the track slideably connecting the arm to the seat.

18. The vehicle seat assembly of claim 17, wherein the elongated track is elongated along a lower surface of the seat bottom in a direction from a first side of the seat to a second side of the seat.

19. The vehicle seat assembly of claim 18, wherein a portion of the elongated track is positioned below the raised section of the seat bottom.

20. The vehicle seat assembly of claim 17, further comprising a slide rail supporting the arm, the slide rail slideably engaging the elongated track.

* * * * *